United States Patent [19]
Hsu et al.

[11] Patent Number: 5,420,725
[45] Date of Patent: May 30, 1995

[54] SYNCHRONOUS DUPLICATE VIDEO RECORDING APPARATUS

[76] Inventors: Jack K. C. Hsu, 24 Idlewild Ct., Pacifica, Calif. 94044; Aldo J. Panattoni, 2040 Texas Way, San Mateo, Calif. 94403

[21] Appl. No.: 214,403
[22] Filed: Mar. 17, 1994
[51] Int. Cl.$^6$ .............................................. G11B 5/86
[52] U.S. Cl. ..................................... 360/15; 360/14.3; 358/335
[58] Field of Search .................. 360/15, 13, 14.1, 14.2, 360/14.3, 31; 358/335, 311

[56] References Cited

U.S. PATENT DOCUMENTS

| | | | |
|---|---|---|---|
| 4,698,664 | 10/1987 | Nichols et al. | 360/14.3 |
| 4,875,107 | 10/1989 | Heidt et al. | 360/9.1 |
| 4,991,025 | 2/1991 | Eigeldinger | 358/310 |
| 5,018,027 | 5/1991 | Roggendorf | 360/14.2 |
| 5,210,659 | 5/1993 | Oguri et al. | 360/27 |
| 5,280,392 | 1/1994 | Koo | 360/15 |

*Primary Examiner*—Andrew L. Sniezek
*Attorney, Agent, or Firm*—R. Russel Austin

[57] ABSTRACT

Video recording apparatus (10) includes master video apparatus (12) including a video camera(16) and a master video recording device (18). The master video recording device is respectively started and stopped by respectively first and second signals (S1 and S2) provided by the camera. The master recording device produces an original video recording. The original video recording includes a time-code (TC) which is not visible in frames of the original recording when it is replayed. A synchronous duplicate video recording apparatus (14) includes a duplicate video recording device (26) and is connected to the master video recording apparatus. The duplicate video recording device provides a duplicate video recording including the time-code. The time-code is visible in frames of the duplicate recording when it is replayed. The synchronous duplicate video recording apparatus includes circuitry (28) which enables the master and duplicate video recording devices to be started and stopped synchronously.

12 Claims, 4 Drawing Sheets

SYNCHRONOUS DUPLICATE VIDEO RECORDING APPARATUS

TECHNICAL FIELD OF THE INVENTION

The present invention relates generally to video recording apparatus. It relates in particular to apparatus for producing a video recording including a time code which is invisible, while simultaneously producing a duplicate of the video recording wherein the time code is visible.

DISCUSSION OF BACKGROUND ART

Video recording is widely used for producing advertising and promotional materials. Typically original video-recordings of subject matter of the advertising or promotional materials are provided by professional video recording specialists on behalf of a client. The recorded subject matter is then reviewed by the client, or advertizing specialists or advisers hired by the client, who select from the recorded material, that which will appear in a finished video presentation. The video recording specialists then prepare the finished video presentation in accordance with editing instructions provided by the client, or by the client's advisers.

In order to facilitate providing the editing instructions, the original video-recordings may be electronically marked with a time-code. The time-code includes data such as an elapsed recording time or a video frame number. The time-code is not visible in the original video-recording when it is replayed by a conventional video tape player. Because of this, in order for a client to see the time-code while reviewing the originally recorded material, a duplicate video recording with a visible time-code must be prepared. This is done using special dubbing apparatus. Such dubbing apparatus extracts the time-code from the original video-recording and imprints the time-code on each frame of the duplicate video-recording, such that it is visible when the duplicate video-recording is replayed and reviewed.

The dubbing apparatus is typically bulky, console-mounted apparatus which is not conveniently transported to a field location at which a video recording session will be carried out. Producing a time-coded duplicate recording is often provided as a laboratory service for producers of video recordings.

Using this type of apparatus there is, at best, some delay between producing the original video-recording and production of the duplicate video-recording. There is typically also a significant cost associated with producing the duplicate video-recording, as it is produced on professional quality apparatus and recording media by skilled operators of the dubbing apparatus. An apparatus for producing a duplicate video-recording of an original video-recording at the same time as the original video-recording is produced would be of significant benefit to producers of video-recordings.

SUMMARY OF THE INVENTION

The present invention is directed to a synchronous duplicate video recording apparatus for use with master video recording apparatus including a video camera and master video recording device for producing an original video recording including a plurality or sequence of video frames. The synchronous duplicate video recording apparatus synchronously records a duplicate of the original video-recording, including each of the frames of the original video-recording, while the original video-recording is being recorded.

The master video recording apparatus and duplicate video recording apparatus are arranged to add a time-code for uniquely identifying each of the video frames. The master video recording apparatus and duplicate video recording apparatus are arranged such that the time-code is not visible in the original video-recording but is visible in each of the video frames of the duplicate video-recording.

In one preferred embodiment of video recording apparatus in accordance with the present invention, master video recording apparatus includes a video camera for providing a first video signal to be recorded. The video signal is representative of a sequence of video frames. The master video recording apparatus includes a master video recording device, which is connected to the video camera. The master video recording device thus receives the first video signal for recording, and receives first and second control signals, provided by the camera, for respectively starting and stopping recording of the first video signal. The master video recording apparatus provides a time-code signal for uniquely identifying each of the video frames and combines the time-code signal with the first video signal to provide an original video-recording. The time-code signal is not visible in any frame of the original video-recording when the recording is replayed.

The synchronous duplicate video recording apparatus is connected to the master video recording apparatus for receiving the first and second control signals, the first video signal and the time-code signal. The synchronous duplicate video recording apparatus includes a time-code writing device for combining the time-code signal with the first video signal to provide a second video signal for forming a duplicate video-recording. The duplicate video recording includes each of the video frames of the original video-recording. The time-code is combined with the first video signal, by the time-code writing device, such that the time-code will be visible in each of the video frames when the duplicate video-recording is replayed.

The synchronous duplicate video recording apparatus includes a duplicate video recording device for recording the second video signal to form the duplicate video recording. The second video recording device is responsive to a third control signal. The third control signal starts the duplicate video recording device when it is not recording, and stops the duplicate video recording device when it is recording.

The synchronous duplicate video recording apparatus also includes a control signal converting device for converting the first and second control signals into the third control signal. The first and second control signals thereby synchronously start and stop recording by the master video recording device and the duplicate video recording device.

In another preferred embodiment of the present invention, the master video recording device does not provide a time-code signal. The synchronous duplicate recording apparatus includes a duplicate video recorder device, a signal converting device and a time-code writing device as described above, and also includes a time-code generating device for generating the time-code signal. The time-code generating device is responsive to the first and second control signals for respectively starting and stopping time-code generation. The time code generating and writing devices may be combined in a single circuit block for generating and writing.

The synchronous duplicate video recording apparatus is connected to the master video recording apparatus for receiving the first video signal and the first and second control signals therefrom, and for transmitting the time-code signal thereto. The time-code signal is received by the master video recording device and combined therein with the first video signal to provide the original video-recording. The time-code and video signal are combined such that the time-code will not be visible when the original recording is replayed. The time-code signal is combined with the first video signal by the time-code writing device to form the second video signal. The second video signal is recorded by the duplicate video recorder device to form the duplicate video-recording. The first video signal and the time-code are combined in such a way that the time-code is visible in each of the frames of the duplicate video-recording.

Within the synchronous duplicate video recording device, the first and second control signals are supplied to the time-code generating device, for respectively starting and stopping time-code generation, and supplied to the signal converting device for conversion to the third signal for both starting and stopping the duplicate recording device. The master video recording device, the time-code generator, and the duplicate video recording device are thus synchronously started and stopped by the first and second control signals.

Usefulness of the present invention relies on the premise that a duplicate video-recording, for making editing decisions for a master video-recording, need not be of the same quality as the master video recording. The synchronous duplicate video recording apparatus of the present invention is thus specifically designed such that the duplicate video recording device therein may be a household video cassette recorder (VCR), or even a miniature VCR of the type which is commonly incorporated in a so called "cam-corder". By using VCR devices of this type, the synchronous duplicate video recording apparatus of the present invention is portable and compact, and is easily transported together with the master video recording apparatus to and from field locations.

Advantages of synchronously producing a time-coded duplicate of an original recording are that the duplicate video-recording is instantly available for making editing decisions, and is produced at an almost insignificant additional cost to producing the original video-recording.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
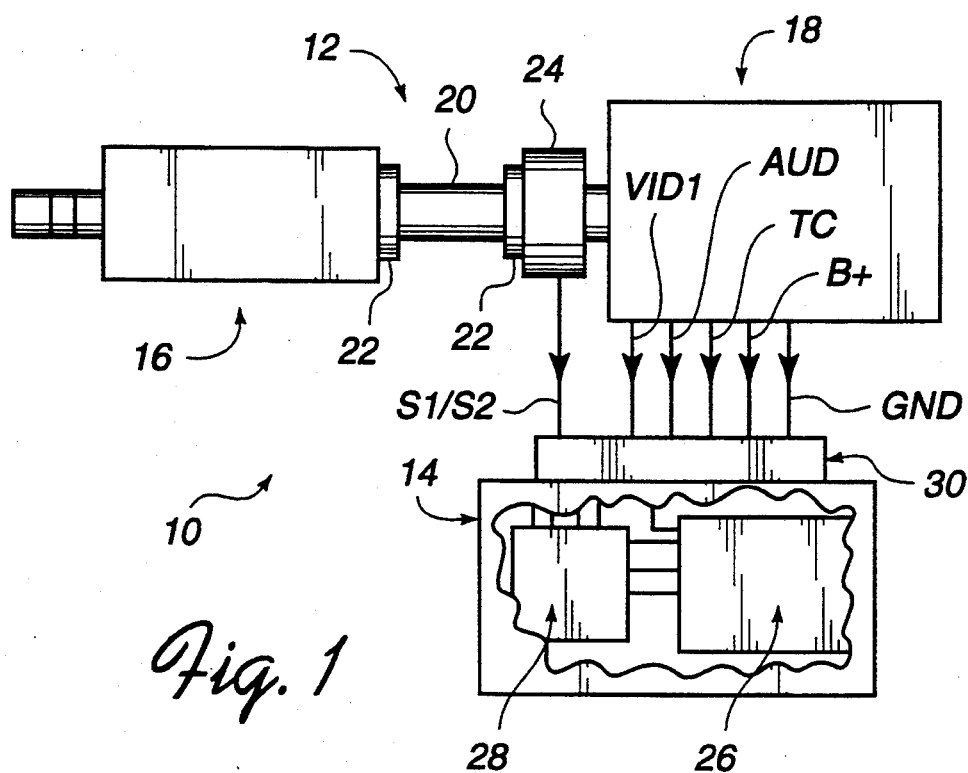
FIG. 1 schematically illustrates one embodiment of video recording apparatus in accordance with the present invention including a video camera connected to a master video recording device, and to synchronous duplicate video recording apparatus including a duplicate video recording device and a device for synchronously starting and stopping recording by the master and duplicate video recording devices.
Figure 2:
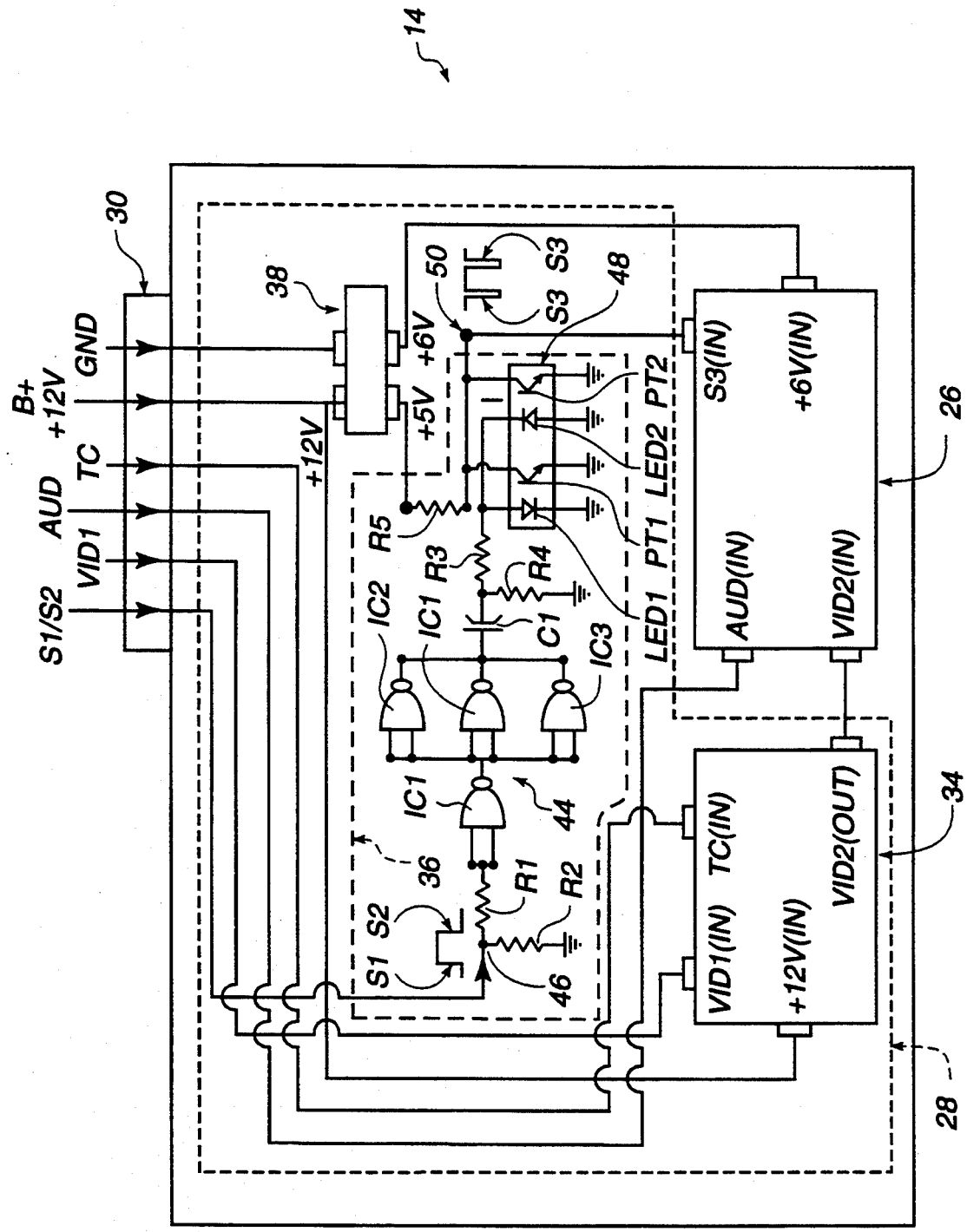
FIG. 2 schematically illustrates one preferred arrangement of the synchronous duplicate video recording apparatus of FIG. 1.

Turning now to the drawings, wherein like components are designated with like reference numerals, FIG. 1 illustrates one preferred embodiment of video recording apparatus 10 arranged, in accordance with the present invention, for providing, simultaneously, a master video-recording and a duplicate video-recording. Apparatus 10 includes master video recording apparatus 12 and synchronous duplicate video recording apparatus 14. Details of one arrangement of synchronous duplicate video recording apparatus 18 and of certain signals transmitted thereto from master video recording apparatus 12 are illustrated in FIG. 2

Master video recording apparatus 12 includes a video camera 16 and a master video recording device 18. Camera 16 is connected, by a cable harness 20, having terminal connectors 22 at each end thereof, to an interface connector 24 which is connected in turn to video recording device 18. Interface connector 24 may be formed from a commercially available inter-connector, such as a twenty-six pin female flange connector and twenty-six pin male cable connector, available from the J-Lab Company, of Malibu, Calif., which is modified or tapped such that certain signals required for operating synchronous duplicate video recording apparatus (described in detail below) may be extracted therefrom.

Master video recording device 18 has a capability to generate a time-code signal (TC) for uniquely identifying each frame of the master video-recording. A typical professional quality video tape and recording device may have the capability to record as many as four audio channels in addition to recording a video signal (VID1) supplied by camera 16. Typically, the time-code is recorded on one of these audio channels such that it is not visible when the master video-recording is replayed. The time-code may be read by specialized tape editing apparatus.

The use of time-codes is well known in the art to which the present invention pertains, and prefabricated circuits for generating or writing such time-codes are commercially available. Accordingly, a description of such circuits and their function is not presented herein.

Recording by master video recording device 18 is started by a starting control signal (S1) and stopped by a stopping control signal (S2). These signals also start and time-code generation by master video recording device 18. These control signals are provided by camera 16. Signal S1 is formed by the rising edge of a square pulse and signal S2 is formed by the falling edge of the square pulse. The pulse duration or length is equal to a particular recording interval.

The function of synchronous duplicate video recording apparatus 14 is to form a duplicate video-recording of the original video-recording formed by video recording device 18. Synchronous duplicate video recording apparatus 18 includes a duplicate video recording device 26 for making this recording. The duplicate video-recording must include the same sequence of video frames as the original video-recording, but must have the time-code included in each frame such that it will be visible in each frame when the duplicate video-recording is replayed. The time-code, of course, must be the same time-code which is included, invisibly, in the original video-recording.

In order to ensure that the duplicate and original video-recordings are identical, recording by duplicate and master video recording devices 18 and 26 must start and stop synchronously. Additionally, recording of the time-code in each video-recording must start and stop synchronously. Recording, of course, may be started and stopped several times during a recording session. In video recording apparatus 12, recording by video recording device 18 is started and stopped by an operator of video camera 18 using a control button or trigger (not shown) thereon to activate control signal S1 or S2 as appropriate. In order to ensure that video recording devices 18 and 26 start and stop synchronously, it must be arranged that control signals S1 and S2 also remotely control video recording device 26.

As discussed above the synchronous duplicate video recording apparatus is designed to operate using a compact video recording device such as a household VCR, or even a miniature VCR of the type used in integrated camera/recorders often referred to as "cam-corders". Such video recorders, however, are incompatible with professional quality video recording apparatus of the type to be used for apparatus 12, in that they are remotely started and stopped by signal which is a single "negative-going" or falling pulse, applied only long enough to start recording if recording is in not in progress, or to stop recording if recording is in progress.

Synchronous duplicate video recording apparatus 14 includes a block 28 of circuitry and components which include means of converting signals S1 and S2 of video recording apparatus 12 into a signal to which video recording apparatus 26 is responsive. Circuit block 28 also includes means for writing time-code TC into each frame of the duplicate video signal.

Figure 3:
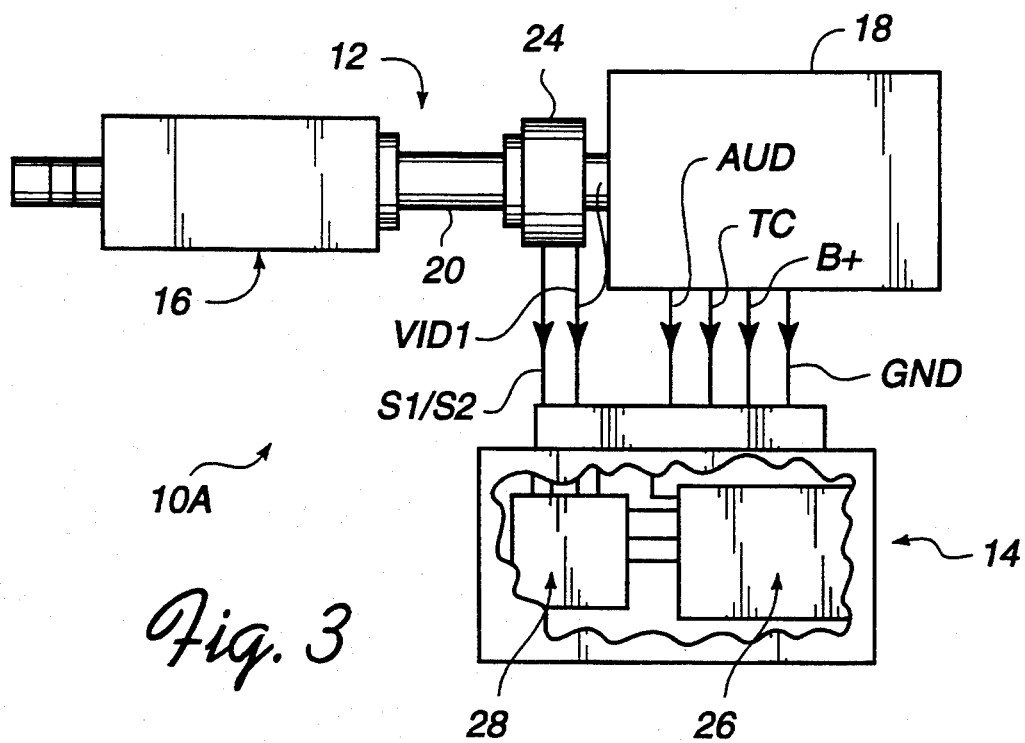
FIG. 3 schematically illustrates an alternate arrangement of an interface connector for connecting components of the apparatus of FIG. 1.

Synchronous duplicate video recording apparatus 14 is supplied with signals S1 and S2 from interface connector 24 (see FIG. 1). The apparatus is also supplied (from video recording device 18) with signal VID1 and TC, for combination in circuit block 28; with at least one audio signal (AUD), for inclusion in the duplicate video-recording; with twelve volts (12 V) electrical potential (B+) for providing power for video recording device 26 and circuit block 28; and with a ground connection access (GND). The signals are transmitted to synchronous duplicate video recording device 14 via an interface connector 30. An alternate signal supply arrangement is illustrated in FIG. 3. Here, in video recording apparatus 10A, signal VID1 is supplied to synchronous duplicate video recording apparatus 14 from interface connector 24 rather than from master video recording device 18.

Set forth below, with reference to FIG. 2, is a description of how the above described signals are processed by synchronous duplicate video recording apparatus 14. In FIG. 2, circuitry and components included in circuit block 28 are enclosed by broken line 28. Included in circuit block 28 is a time-code writing device 34. Time-code writing device 34 is a component which would normally be included in above-discussed prior art commercial dubbing apparatus used for making "after-the-fact" a visibly time-coded duplicate video-recording from an original video-recording including an invisible time-code. Such a component is commercially available as a Horita Model WG-50, available from Audio Images, of San Francisco, Calif. Recording device 26, as illustrated in FIG. 2, is a miniature VCR of the "cam-corder" type discussed above.

Indicated by an enclosing broken line 36 in FIG. 2 are components which form a signal converter, for converting signals S1 and S2 into a form S3. to which video recording device 26 is responsive, both for starting and stopping recording. It should be noted here, that time-code writing by time-code writing device 34 is stopped by signals S1 and S2 at the source of the time-code, i.e., in video recording device 18.

Time-code writing device 34 requires 12 V for operation. It is supplied with this voltage directly from interface connector 30. Video recording device 26 requires only 6 V for operation, and control signal converter 36 requires only 5 V for operation. These voltages are provided by a voltage regulator 38, for example, a model SK7806 available from Andrews Electronics, of Santa Clarita, Calif. Voltage regulator 38 is powered by a 12 V input supplied from interface connector 30, and grounded through ground access connection GND.

Time-code writing device 34 accepts video signal VID1, which does not include a time-code, and combines signal VID1 with time-code signal TC to form a video signal VID2. Video signal VID2 is transmitted to video recording device 26 for forming the duplicate recording. Video signal VID2 includes all of the information of video signal VID1 plus the time-code, which, of course, will be visible when the duplicate recording is replayed. Audio signal AUD, which is not affected by time-code writing, is transmitted directly from interface connector 30 to video recording device 26.

Continuing now with a description of the operating of control signal converter 36, with continuing reference to FIG. 2, control signal S1 is formed by a rising edge of a square pulse, i.e., by an electrical potential rising from a low value (ground, as illustrated) to a high value. The high value here is determined in master video apparatus 12, and may vary according to battery conditions in that apparatus. Potential remains at the high value as long as recording is in progress. Control signal S2 is formed by a falling edge of a square pulse, i.e., by an electrical potential falling from the high value to the low value, at which it remains while recording is not in progress.

Input resistors R1 and R2 preferably have values of about ten Kilohms (10KΩ) and one Megohm (1MΩ) respectively. A buffer arrangement 44 comprising a "tree" of 4011 integrated circuits (ICs), arranged as illustrated, is used to provide that, within signal converter 36, the high potential value of control signals S1 and S2 is always 5 V, independent of the high potential value at input terminal 46. This high value may fall below 5 V if batteries in master video recording apparatus 12 become weak. To maintain the high level of control signals S1 and S2 at 5 V buffer 44 is supplied with 5 V from voltage regulator 38 via IC2, while IC3 is connected to ground. Resistors R3 and R4, and capacitor C1 provide a timing circuit to protect against generation of a starting or stopping pulse by interference from power lines, electrical switch-gear, atmospheric electrical disturbances, and the like. Preferably it is set such that converter circuit 36 is not responsive to pulses of duration shorter than 0.5 seconds or voltage less than 3 V. Suitable component values are about 470 microfarads ($\mu$F) for C1, and about 60 ohms (60 $\Omega$) and greater than 40M$\Omega$ for R3 and R4 respectively.

After preparation by buffer arrangement 44, control signals S1 and S2 are converted to control signal S3 by an optical isolator arrangement 48. Optical isolator 48 includes a light emitting diode (LED) LED1 co-operative with a photo-transistor (switch) PT1, and a light emitting diode LED2 co-operative with a photo-transistor PT2. LED1 and LED 2 are connected in an electrically opposite sense. Photo-transistors PT1 and PT2 are each connected in series with a load-resistor R5 and ground. Load-resistor R3 preferably has a value of about 3.3K$\Omega$ and is, in turn, connected in series between each of photo transistors PT1 and PT2 and the 5 V output of voltage regulator 38. Optical isolator 48 is preferably a model SK2040 available from Andrews Electronics, of Santa Clarita, Calif. When optical isolator 48 receives control signal S1, LED1 emits light (during the transient from low to high). The emitted light illuminates PT1 which closes, causing potential at output terminal 50 to drop from a high value of 5 V to a low value (essentially ground). Once potential at input terminal 46 is steady at a high value, LED1 is extinguished, PT1 opens, and potential at terminal 50 returns to the 5 V level. Thus, a negative-going, short-pulse signal S3 for starting duplicate video recording device 26 is created whenever S2 is applied to start master video recording device 18.

When optical isolator 48 receives control signal S2 LED2 emits light (during the transient from high to low). The emitted light illuminates PT2 which closes, again causing potential at output terminal 50 to drop from a high value of 5 V to a low value. Once potential at input terminal 46 is steady at a low value, LED2 is extinguished, PT2 opens, and potential at terminal 50 returns to the 5 V level. Thus, a negative-going, short-pulse signal S3, for stopping duplicate video recording device 26, is created whenever S2 is applied to stop master video recording device 18. Although S3 is a short pulse, for example of about 0.5 seconds duration, it remains at the low value long enough to start duplicate recording device 23 if recording is not in progress and to stop duplicate recording device 23 if recording is not in progress.

The present invention is described above as it would be embodied in apparatus including a master video recording apparatus which includes a time-code generating capability. This is now common in professional video recording equipment. A significant advantage of the present invention, however, is that it may be embodied in apparatus including master video recording apparatus which does not have a time-code generating capability. For owners of such equipment, the editing benefits of time-coding are not available under any circumstances or at any cost using prior art equipment.

Figure 4:
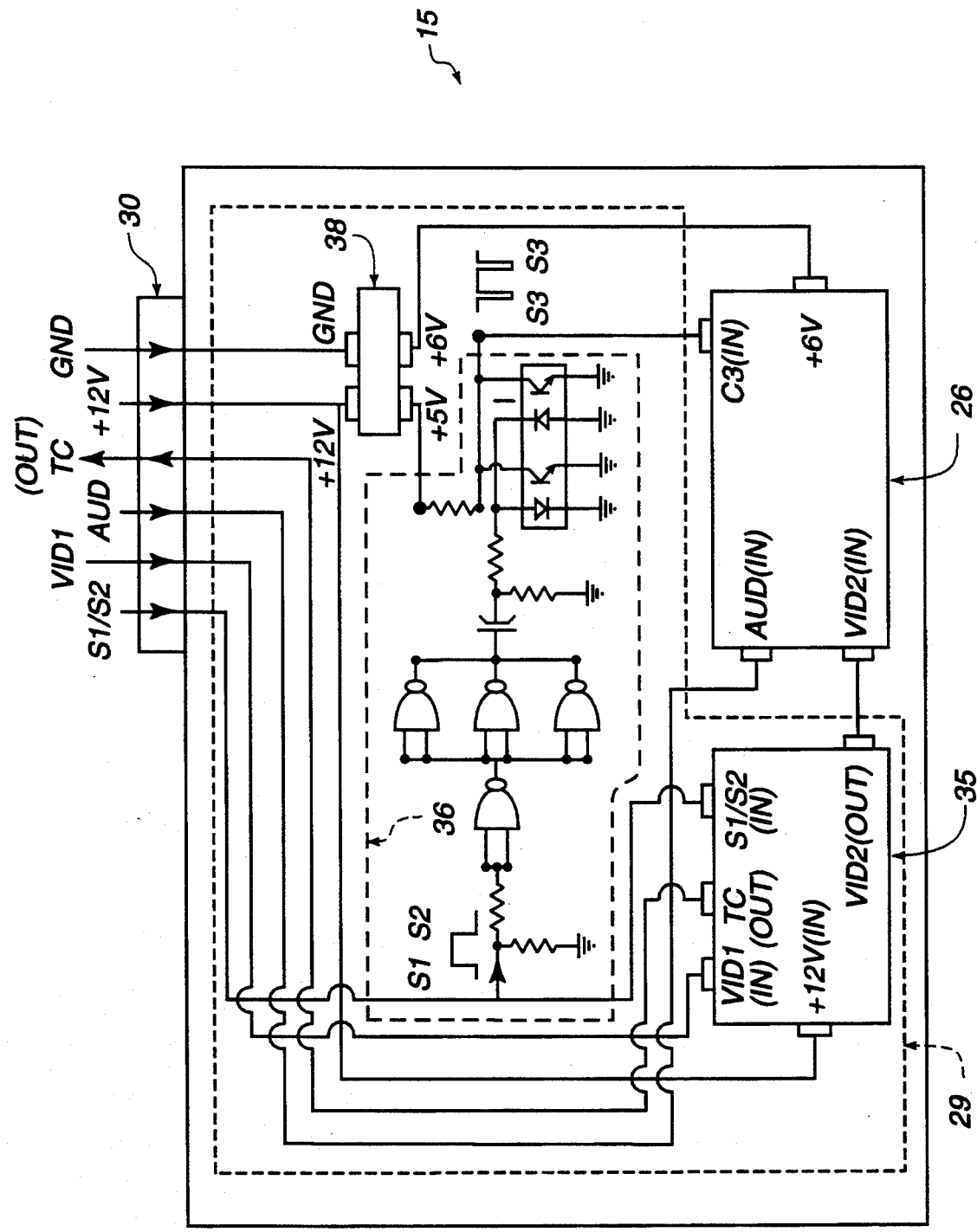
FIG. 4 schematically illustrates another arrangement of the synchronous duplicate video recording apparatus in accordance with the present invention.
Figure 5:
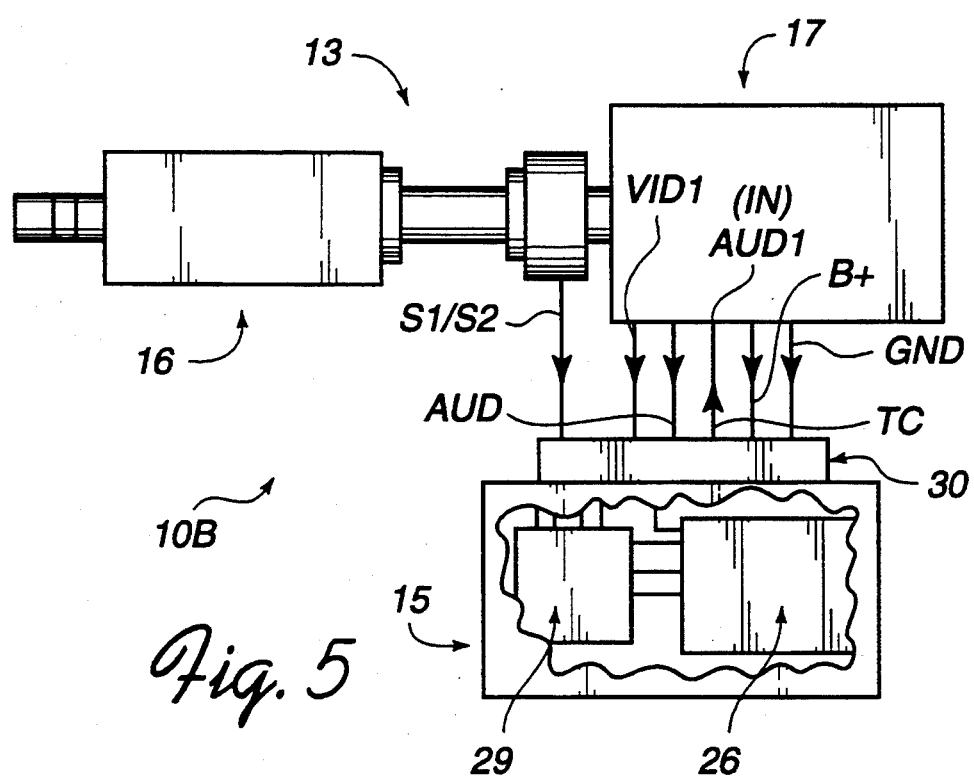
FIG. 5 schematically illustrates an interconnection arrangement for the synchronous duplicate video recording apparatus arrangement of FIG. 4 and master video recording apparatus.

Referring now to FIGS. 4 and 5, an embodiment 10B of the present invention in a synchronous duplicate video recording apparatus 15 for use with master video recording apparatus 13 including a master video recording device 17, not having a time-code generating capability, is illustrated. Here, a circuit block 29 replaces circuit block 28 of synchronous duplicate video recording apparatus 14. Video recorder 26, control signal converter 36, and voltage regulator 36 function as described above.

Time-code writing device 34 of circuit block 28 is replaced in circuit block 29 with a time-code generating and time-code writing device 35. This device may be, for example, a Horita Model TG-50 available from Audio Images, of San Francisco, Calif. Time-code generating and writing device 35 generates time-code TC and combines the time-code with input video signal VID1 to form video signal VID2, for forming the duplicate video-recording. Additionally, time-code generating and writing device 35 supplies the TC, via interface connector 30, to master video recording apparatus 17, wherein it is input via a audio channel input AUD(IN) for invisible incorporation in the original video-recording.

It should be noted that time-code generating and writing device 35 is not responsive to signals of the S3 type for starting and stopping time-code generation, but requires signals of the S1/S2 type. Accordingly, in addition to supplying control signals S1 and S2 to control signal converter 36 for starting and stopping video recording device 26 (via S3), these control signals are supplied to time-code generating and writing device 35 for synchronously starting and stopping time-code generation when video recording devices 17 and 26 are respectively started and stopped.

In summary, the present invention is embodied in synchronous duplicate video recording apparatus, interfaceable with professional master video recording apparatus. The synchronous duplicate video recording apparatus embodying the present invention is specifically designed such that the duplicate video recording device therein may be a household video cassette recorder (VCR) or even a miniature VCR of the type which is commonly incorporated in a so called "camcorder". By using VCR devices of this type, the synchronous recording apparatus of the present invention can be made portable and compact, and is easily transported, together with the master video recording apparatus, to and from video recording locations.

Advantages of synchronously producing a time-coded duplicate of an original recording are that the recording is instantly available for making editing decisions, and is produced at an almost insignificant additional cost to producing the original recording. The present invention also offers a significant benefit in that the capability of producing time-coded original and duplicate video-recordings may be provided to owners of equipment wherein this capability is not available under any circumstances, or at any cost.

The present invention has been described and depicted in the form of a preferred and other embodiments. The invention however is not limited by the embodiments described and depicted. Rather, the invention is limited only by the claims appended hereto.

What is claimed is:

1. A synchronous duplicate video recording apparatus for use with master video recording apparatus including video camera means providing a first video signal to be recorded, the video signal representative of a sequence of video frames, first video recording means connected to the video camera means for receiving the first video signal for recording and for receiving first and second control signals provided by the camera means for respectively starting and stopping recording of the first video signal, and the first video recording means providing a time-code signal and combining the time-code signal with the first video signal to provide an original video-recording, the time-code signal for uniquely identifying each of said video frames but not visible therein when the original-video recording is replayed, the synchronous duplicate video apparatus comprising:
- means for receiving the first and second control signals, the video signal and the time-code signal;
- time-code writing means for combining the time-code signal with the first video signal to provide a second video signal for forming a duplicate video-recording including each of the video frames of the original video-recording, the time-code combined with the first video signal such that it will be visible in each of the video frames when said duplicate video-recording is replayed;
- second video recording means for recording said second video signal to form the duplicate video-recording, said second video recording means responsive to a third control signal, said third control signal for starting and stopping recording by said second video recording means; and
- control signal converting means for converting the first and second control signals into said third control signal, the first and second control signals thereby synchronously starting and stopping the recording by the first video recording means and said second video recording means.

2. The video recording apparatus of claim 1 wherein the first control signal is formed in the camera means by a first electrical potential rising from a first low value to a first high value, said electrical potential remaining at said first high value while recording is in progress, the second control signal being formed in said camera when said first electrical potential falls from said first high value to said first low value, said first electrical potential remaining at said first low value when recording is not in progress.

3. The apparatus of claim 2 wherein said control signal converter means includes buffer means for raising said first high value of said first control signal to a predetermined second high value if said first high value is lower than said second high value.

4. The video recording apparatus of claim 3 wherein said third control signal is formed in said control signal converter means by a second electrical potential falling from a predetermined third high value to a predetermined second low value, remaining at said second low value for a predetermined time period, then rising to said third high value, said time period long enough to start recording by said second video recorder if recording is not proceeding and stop recording by said second video recorder if recording is proceeding.

5. The apparatus of claim 4 wherein said control signal converter means includes optical isolator means, said optical isolator means including a first light-emitting diode responsive to said first control signal and cooperative with a first photo-transistor and a load resistor connected in series therewith for converting the first control signal into said third control signal, and said optical isolator means including a second light-emitting diode responsive to the second control signal and cooperative with a second photo-transistor connected in series with said load resistor for converting the second control signal to said third control signal.

6. A video recording apparatus, comprising:
- master video recording apparatus including video camera means for providing a first video signal to be recorded, said video signal representative of a sequence of video frames, first video recording means connected to said video camera means for receiving said first video signal for recording, and for receiving first and second control signals provided by said camera means for respectively starting and stopping recording of said first video signal by said first video recording means;
- said first video recording means providing a time-code signal and combining said time-code signal with said first video signal to provide an original video-recording, said time-code signal for uniquely identifying each of said video frames, but not visible therein when said original video-recording is replayed;
- said synchronous duplicate video recording apparatus including means for receiving said first and second control signals, said video signal and said time-code signal;
- said synchronous duplicate video recording apparatus including time-code writing means for combining said time-code signal with said first video signal to provide a second video signal for forming a duplicate video-recording including each of the video frames of the original video recording, the time-code combined with the first video signal such that it will be visible in each of the video frames when said duplicate video-recording is replayed;
- said synchronous duplicate video recording apparatus including second video recording means for recording said second video signal to form said duplicate video recording, said second video recording means responsive to a third control signal, said third control signal for starting and stopping recording of said second video signal by said second video recording means; and
- control signal converting means for converting the first and second control signals into said third control signal, the first and second control signals thereby synchronously starting and stopping recording by said first and second video recording means.

7. The synchronous duplicate video recording apparatus of claim 6 further including first interface connector means for connecting the said first video recorder means to said camera means for receiving said first video signal and said first and second control signals therefrom, and second interface means, said second interface means connected to said first interface means for receiving said first and second control signals from said camera, to said first video recorder means for receiving said video signal and said time-code signals therefrom, and to said synchronous duplicate video recording means for transmitting said video signal, said first and second control signals, and said time-code signal thereto.

8. The video recording apparatus of claim 6 wherein said first control signal is formed in said camera means by a first electrical potential rising from a first low value to a first high value, said electrical potential remaining at said first high value while recording is in progress, said second control signal being formed in said camera means when said first electrical potential falls from said first high value to said first low value, said first electrical potential remaining at said first low value when recording is not in progress.

9. The apparatus of claim 8 wherein said control signal converter means includes buffer means for raising said first high value of said first control signal to a predetermined second high value if said first high value is lower than said second high value.

10. The video recording apparatus of claim 9 wherein said third control signal is formed in said converter means, in response to any one of said first and second control signals by a second electrical potential falling from a predetermined third high value to a predetermined second low value, remaining at said second low value for a predetermined time period, then rising to said third high value, said time period long enough to start recording by said second video recording means if recording is not proceeding and stop recording by said second video recording means if recording is proceeding.

11. The apparatus of claim 10 wherein said control signal converter means includes optical isolator means said optical isolator means including a first light-emitting diode responsive to said first control signal and cooperative with a first photo-transistor and a load resistor connected in series therewith for converting said first control signal into said third control signal, and said optical isolator means including a second light-emitting diode responsive to said second signal and cooperative with a second photo-transistor connected in series with said load resistor for converting said second control signal to said third control signal.

12. A video recording apparatus, comprising:
master video recording apparatus including video camera means for providing a first video signal to be recorded, said video signal representative of a sequence of video frames, first video recording means connected to said video camera means for receiving said first video signal for recording, and for receiving first and second control signals provided by said camera means for respectively starting and stopping recording of said first video signal by said first video recording means;
said first video recording means providing a time-code signal and combining said time-code signal with said first video signal to provide an original video recording;
synchronous duplicate video recording apparatus including time-code generating means for generating a time-code signal for uniquely identifying each of said video frames, said synchronous duplicate video recording means connected to said master video recording means for receiving the first and second control signals and the video signal therefrom, and for transmitting the time-code signal thereto, and said time-code generating means responsive to said first signal for starting generation of said time-code and to said second signal for stopping generation of said time-code;
said time-code signal and said first video signal recorded by said first video recording apparatus to provide an original video recording in which the recorded time-code is not visible in the video frames when the recording is replayed;
said, time-code generating means combining said time-code signal with said first video signal to provide a second video signal for forming a duplicate video recording including each of the video frames of the original video recording, the time-code combined with the first video signal such that it will be visible in each of the video frames when said duplicate video recording is replayed;
said synchronous duplicate video recording apparatus including second video recording means for recording said second video signal to form said duplicate video recording, said second video recording means responsive to a third control signal, said third control signal for starting and stopping recording of said second video signal by said second video recording means; and
control signal converting means for converting the first and second control signals into said third control signal, the first and second control signals thereby synchronously starting and stopping recording by said first and second video recording means.

* * * * *